United States Patent [19]

Shimozono et al.

[11] Patent Number: 5,374,793
[45] Date of Patent: Dec. 20, 1994

[54] ACCELERATION SENSOR

[75] Inventors: Shigeru Shimozono; Ryo Satoh, both of Kanagawa, Japan

[73] Assignee: Takata Corporation, Tokyo, Japan

[21] Appl. No.: 102,783

[22] Filed: Jun. 8, 1993

[30] Foreign Application Priority Data

Aug. 25, 1992 [JP] Japan .................. 4-225683

[51] Int. Cl.⁵ ............................................ H01H 35/14
[52] U.S. Cl. ......................... 200/61.45 M; 200/61.53; 200/275
[58] Field of Search .............. 200/61.45 R, 61.45 M, 200/61.48, 61.51, 61.52, 61.53, 269, 275

[56] References Cited

U.S. PATENT DOCUMENTS

| | | | |
|---|---|---|---|
| 4,642,891 | 2/1987 | Weik et al. | 29/879 |
| 4,827,091 | 5/1989 | Behr | 200/61.45 M |
| 4,933,515 | 6/1990 | Behr et al. | 200/61.45 M |
| 5,053,588 | 10/1991 | Bolender | 200/61.45 R |
| 5,210,384 | 5/1993 | Shimozono et al. | 200/61.45 M |

FOREIGN PATENT DOCUMENTS 2247353A 2/1992 United Kingdom .

Primary Examiner—Marc S. Hoff
Assistant Examiner—Michael A. Friedhofer
Attorney, Agent, or Firm—Kanesaka & Takeuchi

[57] ABSTRACT

The acceleration sensor is formed of a cylinder; an inertial member slidably mounted in the cylinder so as to be movable in the longitudinal direction of the cylinder; a conductive member fixed at least on an end surface of the inertial member facing one longitudinal end of the cylinder; a pair of electrodes fixed relative to the cylinder at one longitudinal end of the cylinder and which, when the conductive member of the inertial member makes contact with the electrodes, are caused to conduct via the conductive member; and an attracting member fixed relative to the cylinder near the other longitudinal end of the cylinder, for magnetically attracting the inertial member. The electrodes are formed by a metal sheet whose basal ends are held by an electrode holding member and whose front ends are protruding in the travel area of the inertial member, and one of planes of the metal sheet is disposed so that it faces to the inertial member. In the acceleration sensor, the edge portions of the sheet metal forming the electrode are bent in the direction opposite to the inertial member.

5 Claims, 5 Drawing Sheets

FIG. 4 *Prior Art*
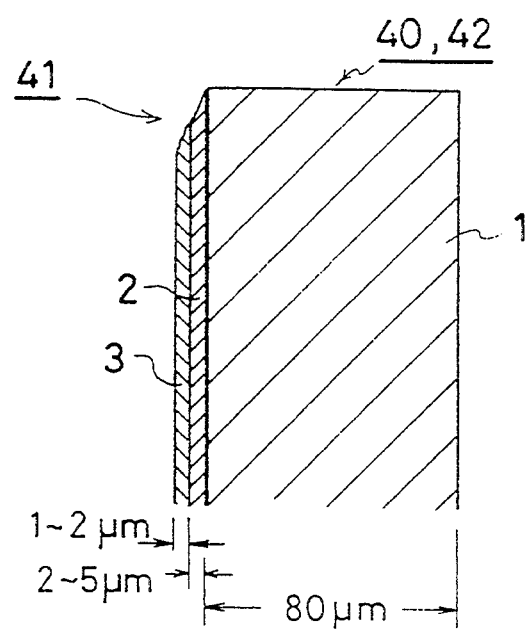
FIG. 5
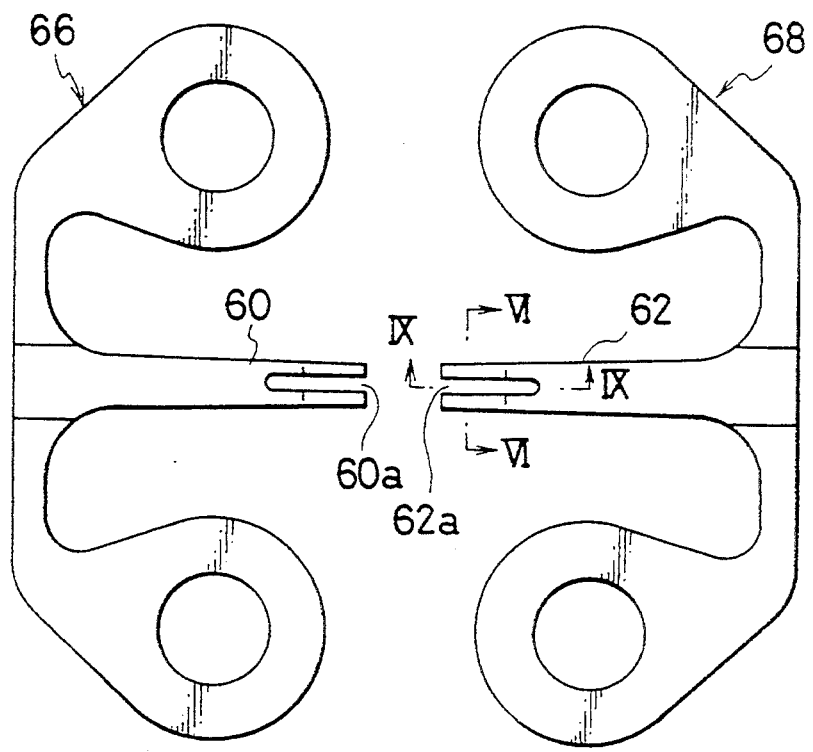

ACCELERATION SENSOR

BACKGROUND OF THE INVENTION

1. Field of the Invention

The present invention relates to an acceleration sensor and, more particularly, to an acceleration sensor suitable for detecting a large change in the speed of a vehicle caused by a collision and the like.

2. Description of the Related Art

An acceleration sensor of this kind is described in U.S. Pat. No. 4,827,091. This known sensor comprises a cylinder made of a conductive material, a magnetized inertial member slidably mounted in the cylinder so as to be movable in the longitudinal direction of the cylinder, a conductive member fixed at least on an end surface of the inertial member facing one longitudinal end of the cylinder, a pair of electrodes fixed at one longitudinal end of the cylinder, which are caused to conduct via the conductive member when the conductive member of the magnetized inertial member makes contact with the electrodes, and an attracting member fixed relative to the cylinder near the other longitudinal end of the cylinder and made of such magnetic material that magnetically attracts the inertial member.

In this acceleration sensor, the magnetized inertial member and the attracting member attract each other and when no or almost no acceleration is applied to the sensor, the inertial member is at rest at the other end in the cylinder.

If a relatively large acceleration acts on this acceleration sensor, the magnetized inertial member moves against the attracting force of the attracting member. During the movement of the inertial member, an electrical current is induced in this cylinder, producing a magnetic force which biases the inertial member in the direction opposite to the direction of movement of the inertial member. Therefore, the magnetized inertial member is braked, so that the speed of the movement is reduced.

When the acceleration is less than a predetermined magnitude, or threshold value, the magnetized inertial member comes to a stop before it reaches the front end of the cylinder. Then, the inertial member is pulled back by the attracting force of the attracting member.

When the acceleration is greater than the predetermined magnitude, or the threshold value, e.g., the vehicle carrying this acceleration sensor collides with an object, the inertial member reaches at one end of the cylinder. At this time, the conductive layer on the front end surface of the inertial member makes contact with both electrodes to electrically connect them with each other. If a voltage has been previously applied between the electrodes, an electrical current flows when a short circuit occurs between them. This electrical current permits detection of collision of the vehicle.

FIG. 2 is a perspective view illustrating these electrodes 40 and 42, FIG. 3 is a cross-section view taken along III—III line in FIG. 2 and FIG. 4 is an enlarged view of the main part of FIG. 3. These electrodes 40 and 42 are formed as parts of conductive pieces 46 and 48, respectively, which are stamped from sheet metal. The conductive pieces 46 and 48 have terminals 50 and 52, respectively, with which lead wires (not shown) are connected. An electrical resistor 54 is bridged between the conductive pieces 46 and 48 and lead electrodes 54a and 54b of the electrical resistor 54 are soldered to the conductive pieces 46 and 48, respectively.

The conductive pieces 46 and 48 which are connected together through the electrical resistor 54 are insert-molded out of a synthetic resin together with the resistor 54. The resistor 54 and main portions of the conductive pieces 46 and 48 are buried in a holding member called a contact holder.

In the prior art acceleration sensor, however, the front end surface of the magnetized inertial member tends to hit the edge portions of the electrodes 40 and 42 when it hits the electrodes 40 and 42. It is because there is a small gap between the outer periphery of the magnetized inertial member and the inner periphery of the cylinder, and the front end surface of the magnetized inertial member slants slightly from a plane perpendicular to the axial line of the cylinder. The gap is about 0.3 mm when the inner diameter of the cylinder is 7 mm and the length of the magnetized inertial member is 12 mm. Due to that, the front end surface of the magnetized inertial member can slant from the plane perpendicular to the axial line of the cylinder by the gap of 0.3 mm. And due to that slant, the front end surface of the magnetized inertial member hits the edge portions 41 of the electrodes 40 and 42.

When the front end surface of the magnetized inertial member hits the edge portions of the electrodes 40 and 42, a contact pressure of the magnetized inertial member and the electrodes 40 and 42 becomes unstable, causing an unstable contact resistance of the magnetized inertial member and the electrodes 40 and 42.

As shown in FIG. 4 (a partially enlarged view of the edge portion 41 in FIG. 3), the electrodes 40 and 42 are stamped from a clad in which a surface layer 3 made of a gold-silver alloy (e.g. silver content is about 8 wt. %) having a thickness of 1 to 2 micrometer is clad to the surface of a base material 1 composed of a copper alloy (e.g. a copper-beryllium alloy) having a thickness of about 80 micrometer through the intermediary of a substrate layer 2 made of silver-palladium alloy (e.g. palladium content is about 60 wt. %) having a thickness of 2 to 5 micrometer. The reason why such gold alloy is clad is to enhance the corrosion resistance of the electrode surface. However, the substrate layer 2 and surface layer 3 tend to become deficient at the edge of the electrodes 40 and 42 when stamped as shown in FIG. 4. Accordingly, if the magnetized inertial member hits the edge portion where such gold alloy surface layer 3 is deficient, the contact resistance of the magnetized inertial member and the electrodes 40 and 42 becomes unstable.

OBJECT AND SUMMARY OF THE INVENTION

It is an object of the invention to eliminate the aforementioned problems by providing an acceleration sensor in which the contact resistance of the electrodes and the magnetized inertial member is stabilized and thereby which allows to detect their contact in high precision.

An acceleration sensor according to the invention comprises: a cylinder; an inertial member slidably mounted in the cylinder so as to be movable in the longitudinal direction of the cylinder; a conductive member fixed at least on an end surface of the inertial member facing the one longitudinal end of the cylinder; a pair of electrodes fixed relative to the cylinder at one longitudinal end of the cylinder and which, when the conductive member of the inertial member makes contact with the electrodes, are caused to conduct via the conductive member; and an attracting member fixed relative to the cylinder near the other longitudinal end of the cylinder, for magnetically attracting the inertial member. The electrode is formed by a metal sheet whose basal end side is held by an electrode holding member and whose front end side is protruding in the travel area of the inertial member, and one of planes of the metal sheet is disposed so that it faces to the inertial member. The acceleration sensor is characterized in that the edge portions of the sheet metal forming the electrodes are bent in the direction opposite to the inertial member.

According to the acceleration sensor of the invention, the edge portions of the electrodes are bent in the direction opposite to the inertial member, so that the front end surface of the inertial member hits the surface of the electrode. Accordingly, a contact pressure of the conductive member on the front end surface of the inertial member and the electrode is stabilized, thereby stabilizing a contact resistance between them.

Furthermore, even if the surface layer has been deficient at the edge portion of the electrode, the inertial member hits the middle part of the electrode rather than the edge portion thereof and accordingly, the inertial member always hits the surface layer. Thereby the contact resistance of the electrodes and the inertial member is stabilized.

BRIEF DESCRIPTION OF THE DRAWINGS

FIG. 4 is an enlarged cross-section view of the main part of the prior art electrodes;

FIG. 5 is a plan view illustrating electrodes according to the invention;

DETAILED DESCRIPTION OF PREFERRED EMBODIMENT

Figure 1:
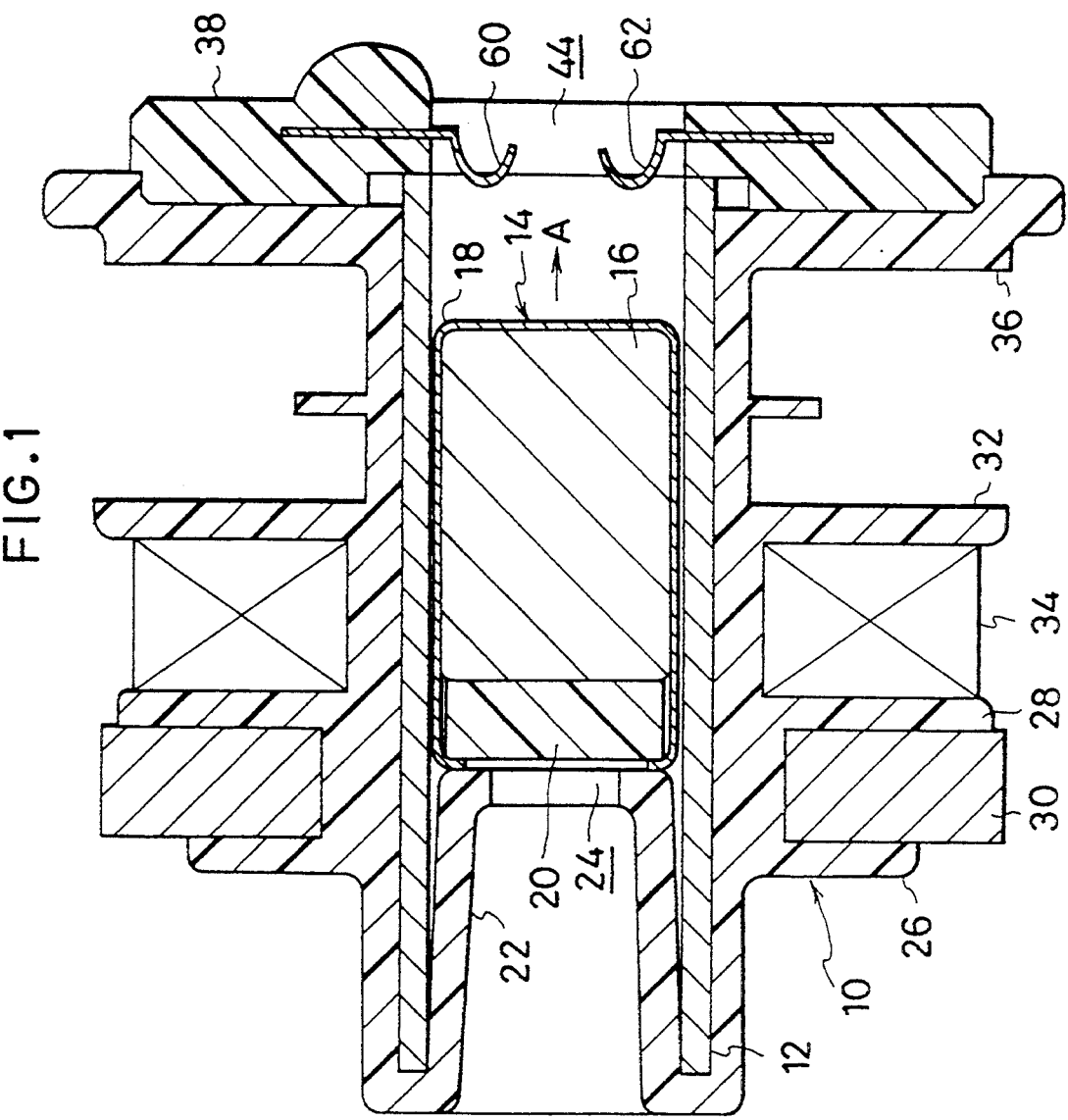
FIG. 1 is a cross-section view of an acceleration sensor according to the invention.

Referring now to the drawings, a preferred embodiment of the invention will be explained in detail. FIG. 1 is a cross-section view of an acceleration sensor of the embodiment of the invention taken along the longitudinal direction of a cylinder.

In FIG. 1, a cylinder 12 made of a copper alloy is held inside a cylindrical bobbin 10 made of a nonmagnetic material such as a synthetic resin, and a magnetized inertial member (magnet assembly) 14 is slidably mounted in the cylinder 12. This magnet assembly 14 comprises a cylindrical permanent magnet 16, a cylindrical case 18 made of a nonmagnetic conductive material, and a packing 20 made of a synthetic resin for holding the magnet 16 within the case 18. The magnet assembly 14 is fitted in the cylinder 12 so as to be movable in the longitudinal direction of the cylinder 12.

The bobbin 10 has an insert portion 22 whose one end enters the cylinder 12. An opening 24 is formed at the front end of the insert portion 22. A pair of flanges 26 and 28 protrude laterally near the front end of the insert portion 22 of the bobbin 10. An annular attracting material (return washer) 30 made of iron and the like is held between the flanges 26 and 28.

The bobbin 10 has another flange 32 and a coil 34 is wound between the flanges 28 and 32. A further flange 36 is formed at the other end of the bobbin 10 and a contact holder 38 is mounted to the flange 36.

This contact holder 38 is made of synthetic resin, and a pair of electrodes 60 and 62 are buried in the holder 38. The front ends of the electrodes 60 and 62 protrude into an opening 44 formed in the center of the contact holder 38. The electrodes 60 and 62 have arc-shaped front end portions and parts of the arc-shaped front end portions are substantially flush with the front end surface of the cylinder 12.

Slits 60a and 62a are formed in the front end of the electrodes 60 and 62 (FIG. 5). The slits 60a and 62a however, may not be formed.

Figure 6:
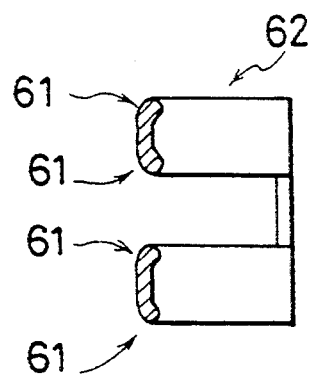
FIG. 6 is an enlarged cross-section view taken along VI—VI line in FIG. 5.
Figure 7:
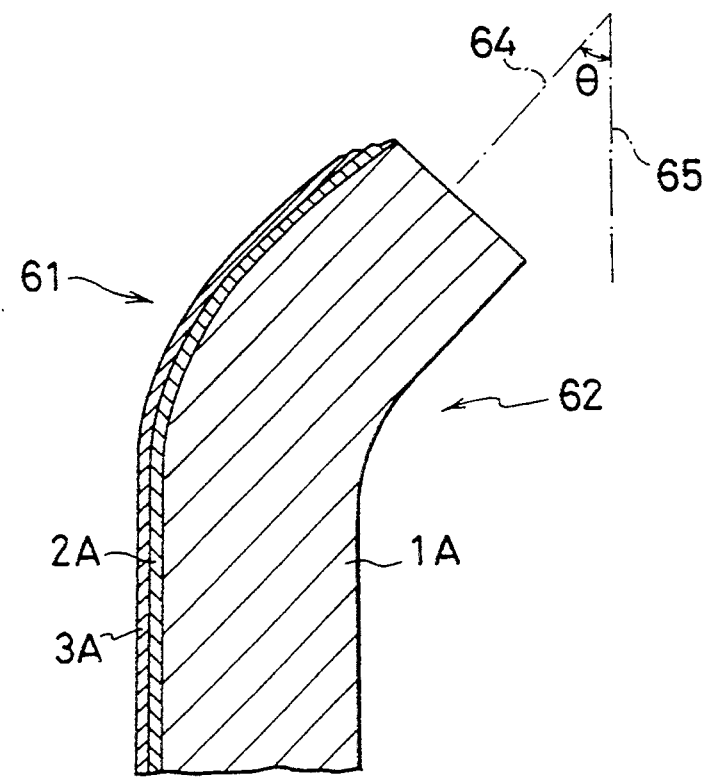
FIG. 7 is an enlarged view of the main part of the electrode in FIG. 6.

FIG. 5 is a plan view of the electrodes 60 and 62, FIG. 6 is an enlarged view taken along line VI—VI in FIG. 5 and FIG. 7 is an enlarged cross-section view illustrating a construction of the edge portion of the electrodes 60 and 62.

These electrodes 60 and 62 are formed as parts of conductive pieces 66 and 68, respectively, which are stamped from a sheet metal.

The edge portions 61 of the electrodes 60 and 62 are bent in the direction opposite to the magnet assembly 14. In the present embodiment, the electrodes 60 and 62 are constructed by cladding a surface layer 3A made of a gold-silver alloy on the surface of a base material 1A made of a copper-beryllium alloy through the intermediary of a substrate layer 2A made of a silver-palladium alloy. Their alloy composition are the same as those of the conventional ones. As shown in FIG. 7, a direction 64 of the edge portion 61 is desirable to slant by angle $\theta$ which is more than 5° from a plate plane direction 65 of the electrodes 60 and 62.

In such electrodes 60 and 62, because the surface of the edge portions 61 are curling as shown in FIG. 7, the magnet assembly 14 always hits the surface layer 3A made of the gold-silver alloy and does not hit the edge portions of the electrodes 60 and 62 where the surface layer 3A and substrate layer 2A are deficient.

Thus a contact resistance of the electrodes 60 and 62 and the magnet assembly 14 is stabilized.

In the acceleration sensor constructed as described above, when no external force is applied, the magnet assembly 14 and the return washer 30 attract each other. Under this condition, the rear end of the magnet assembly 14 is in the illustrated rearmost position where it bears against the front end surface of the insert portion 22. If an external force acts in the direction indicated by the arrow A, then the magnet assembly 14 moves in the direction indicated by the arrow A against the attracting force of the return washer 30. This movement induces an electrical current in the cylinder 12 made of a copper alloy, thus producing a magnetic field. The magnetic field applies a magnetic force to the magnet assembly 14 in the direction opposite to the direction of movement. As a result, the magnet assembly 14 is braked.

When the external force applied to the acceleration sensor is small, the magnet assembly 14 comes to a stop on its way to one end of the cylinder 12. The magnet assembly 14 will soon be returned to its rearmost position shown in FIG. 1 by the attracting force acting between the return washer 30 and the magnet assembly 14.

If a large external force which may be caused by a collision of the vehicle is applied in the direction indicated by the arrow A, then the magnet assembly 14 advances up to the front end of the cylinder 12 and comes into contact with the electrodes 60 and 62. At this time, the case 18 of the magnet assembly 14 which is made of a conductive material creates a short-circuit between the electrodes 60 and 62, thus producing an electrical current between them. This permits detection of an acceleration change greater than the intended threshold value. Consequently, the collision of the vehicle is detected.

The aforementioned coil 34 is used to check the operation of the acceleration sensor. That is, when the coil 34 is electrically energized, it produces a magnetic field which biases the magnet assembly 14 in the direction indicated by the arrow A. The magnet assembly 14 then advances up to the front end of the cylinder 12, short-circuiting the electrodes 60 and 62. In this way, the coil 34 is energized to urge the magnet assembly 14 to move. Thus, it is possible to make a check to see whether the magnet assembly 14 can move back and forth without trouble and whether the electrodes 60 and 62 can be short-circuited.

As such, because the contact resistance of the electrodes 60, 62 and the magnet assembly 14 is stabilized as described above in the present embodiment, the contact of the electrodes 60, 62 and the magnet assembly 14 may be detected in high precision.

Figure 2:
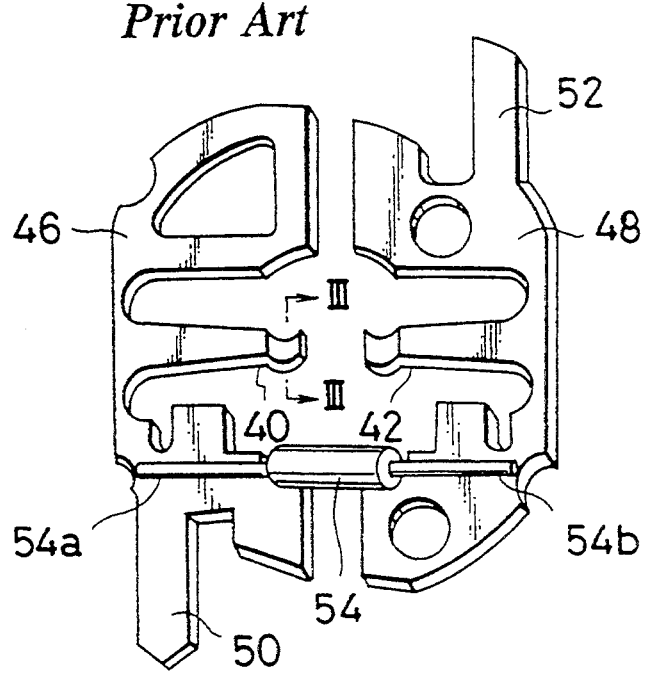
FIG. 2 is a perspective view of prior art electrodes.
Figure 3:
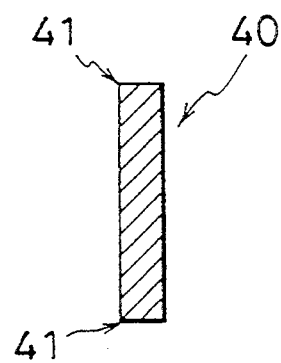
FIG. 3 is an enlarged cross-section view taken along III—III line in FIG. 2.
Figure 8:
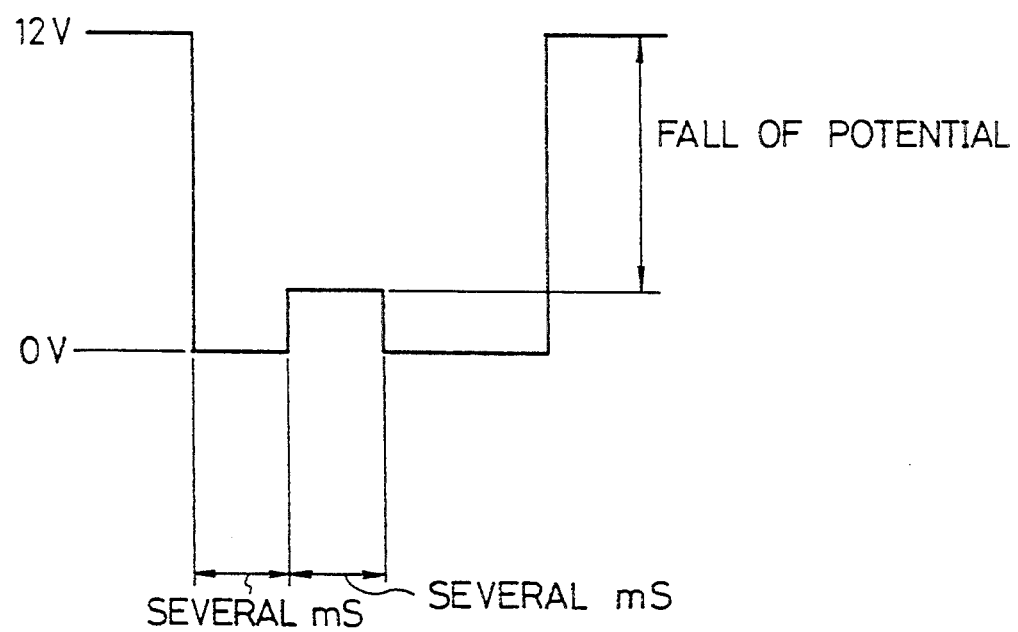
FIG. 8 is a graph for explaining a resistance measuring method.
Figure 9:
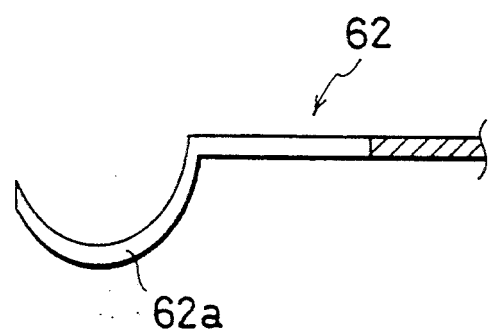
FIG. 9 is a cross-section view taken along IX—IX line in FIG. 5.

The contact resistance between the prior art electrodes 40, 42 shown in FIGS. 2 through 4 and the magnet assembly 14 and the resistance between the electrodes 60, 62 of the invention ($\theta = 45°$) shown in FIGS. 5 through 7 and the magnet assembly 14 were measured. The measuring method used was a fall-of-potential method of a contact resistance measuring method (dynamic). That is, after several mS since the contact has been made by applying a predetermined impact value which fully turns ON the sensor, a predetermined current is flown for several mS to the contact as shown in FIG. 8 and a fall of potential at that time is measured (at several points) to calculate a contact resistance (an average of the several points). Table 1 shows resistance values measured on the items of the invention and of the prior art.

TABLE 1

| Prior Art Item | Item of the Invention |
| --- | --- |
| n = 20 | n = 20 |
| X = 86 | X = 77 |
| sigma$_{n-1}$ = 4.1 | sigma$_{n-1}$ = 1.4 |
| Max = 97 | Max = 80 |

TABLE 1-continued

| Prior Art Item | Item of the Invention |
| --- | --- |
| Min = 80 | Min = 75 | where;
n: number of measured samples
X: average (in unit of ohm)
sigma$_{n-1}$: standard deviation
Max: maximum value
Min: Minimum value From this measurement result, it is also apparent that the contact resistance of the electrodes 60, 62 and the magnet assembly 14 is stabilized by the invention.

As described above, because the edge portions of the electrodes which contact with the inertial member are bent in the direction opposite to the inertial member in the acceleration sensor of the invention, the contact resistance of the electrodes and the inertial member is stabilized and the contact between the electrodes and the magnet assembly may be detected in high precision. It also remarkably improve a precision of acceleration detection.

What is claimed is:

1. An acceleration sensor, comprising:
   a cylinder,
   an inertial member inserted in the cylinder so as to be movable in a longitudinal direction of the cylinder,
   a conductive member fixed at least on an end surface of the inertial member facing one longitudinal end of the cylinder,
   an attracting member fixed relative to the cylinder near the other longitudinal end of the cylinder for magnetically attracting said inertial member, and
   a pair of electrodes fixed relative to the cylinder at said one longitudinal end of the cylinder, said electrodes, when the conductive member of said inertial member contacts the electrodes, being caused to conduct through the conductive member, said electrodes being formed of a metal sheet and having basal end portions and front end portions extending from the basal end portions and facing the inertial member in the cylinder, each front end portion having a main portion, a forward edge located at a position away from the basal end and two side edges located between the forward edge and the basal end portion, said side edges being bent relative to the main portion in a direction away from the inertial member so that when the inertial member contacts the electrodes, the main portion contacts the conductive member.

2. An acceleration sensor according to claim 1, wherein said front end portion is partly curved such that a part of the main portion projects toward the inertial member to be able to contact with the inertial member.

3. An acceleration sensor according to claim 2, further comprising an electrode holding member attached to the cylinder, said basal ends being held in the electrode holding member.

4. An acceleration sensor according to claim 1, wherein a surface layer made of a gold-silver alloy is provided on the main portion of said metal sheet facing to said inertial member through an intermediary of a substrate layer made of a silver-palladium alloy.

5. An acceleration sensor according to claim 1, wherein the edge portions of said metal sheet are slanted by 5° to 45° from the main portion of said metal sheet.

* * * * *

UNITED STATES PATENT AND TRADEMARK OFFICE
CERTIFICATE OF CORRECTION

PATENT NO. : 5,374,793
DATED : December 20, 1994
INVENTOR(S) : Shigeru Shimozono, et. al.

It is certified that error appears in the above-indentified patent and that said Letters Patent is hereby corrected as shown below:

Title page, item [22], filing date, change "jun. 8, 1994" to -- August 6, 1993--.

Signed and Sealed this

Fourteenth Day of February, 1995

Attest:

BRUCE LEHMAN

Attesting Officer     Commissioner of Patents and Trademarks